(No Model.)
M. TURLEY & R. T. BRYANT.
PLOW.
No. 365,156.  Patented June 21, 1887.
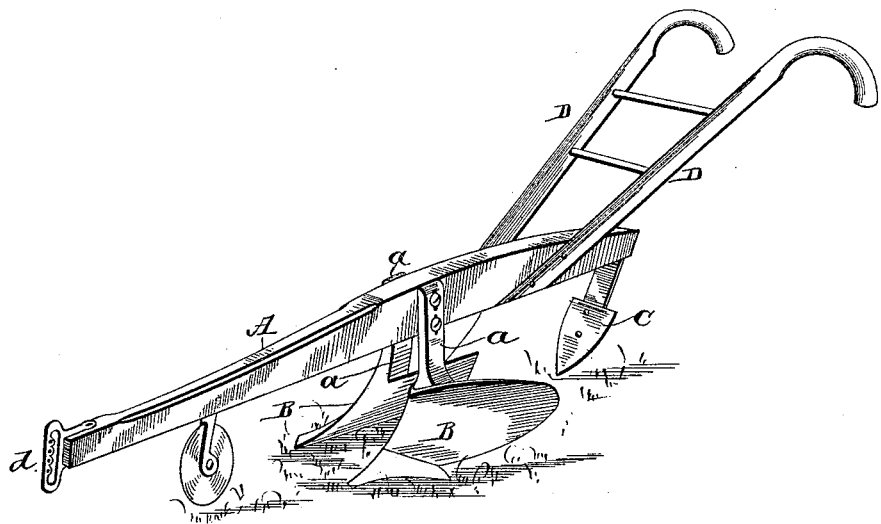
WITNESSES
Geo. F. Downing.
Wm. R. Patton.
INVENTOR
Marshall Turley
Reuben T. Bryant
By H. A. Seymour
Attorney
N. PETERS. Photo-Lithographer, Washington, D. C.

UNITED STATES PATENT OFFICE.

MARSHALL TURLEY AND REUBEN T. BRYANT, OF COUNCIL BLUFFS, IOWA.

PLOW.

SPECIFICATION forming part of Letters Patent No. 365,156, dated June 21, 1887.

Application filed November 19, 1886. Serial No. 219,406. (No model.)

*To all whom it may concern:*

Be it known that we, MARSHALL TURLEY and REUBEN T. BRYANT, of Council Bluffs, in the county of Pottawattamie and State of Iowa, have invented certain new and useful Improvements in Plows; and we do hereby declare the following to be a full, clear, and exact description of the invention, such as will enable others skilled in the art to which it appertains to make and use the same.

Our invention relates to an improvement in plows for listing corn.

It is customary, especially among the farmers of the west, to list their ground and drill their corn. Heretofore the trouble has been that during heavy rains the water accumulated in the furrows and rotted or washed out the seed-corn.

The object of our present invention is to provide a bed of loose earth for receiving the corn to be planted, and also to provide means whereby the water during heavy rains is led off from the corn.

A further object is to provide a device which will be simple, durable, and inexpensive.

With these ends in view our invention consists in certain features of construction and combinations of parts, as will be hereinafter described, and pointed out in the claim.

In the accompanying drawing is represented a view in perspective of our improved device.

A represents a plow-beam having near its rear end two plow-standards, *a*, secured on the opposite faces of said beam, and having curved plowshares B attached thereto, whereby the earth is given a rolling motion and is thrown to the right and left. The beam A is further provided with a shovel-plow, C, attached to the rear end of the beam, whereby the ridge left unplowed between the two plows is adapted to form a bed for the seed-corn to be planted in. The action is very simple, as the shovel passing through the ridge left unplowed makes a furrow, and as the plow moves a small quantity of the loose earth falls back in said furrow, thus making a loose and soft bed for the corn. The beam is further provided with a rolling colter, secured to the beam in any well-known manner, and is adapted to make a path, as well as cut the weeds, for the shovel-plow to pass in. During heavy rains the water accumulating in the corn-furrow is led off by reason of the easy penetration of the water through the loose dirt constituting the corn-furrow into one of the broad furrows on each side of said corn-furrow, and there stands or soaks into the ground.

A pair of handles, D, are secured to the beam in any well-known manner and adapted to act as means for guiding the plow.

A clevis, *d*, is attached to the fore part of the beam as means for hitching the team.

It is evident that slight changes might be resorted to in the form and arrangement of the several parts described without departing from the spirit and scope of our invention; hence we do not wish to limit ourselves strictly to the exact construction herein set forth, but consider ourselves at liberty to make such changes that fall within the spirit and scope of our invention.

Having fully described our invention, what we claim as new, and desire to secure by Letters Patent, is—

In a plow for listing corn, the combination, with a beam, of two plows attached to the opposite faces of said beam and a shovel-plow attachment secured to the rear end of the beam and adapted to pulverize the ridge left unplowed by the two plows, and a rolling colter attached to the fore part of the beam and adapted to form a path for the shovel-plow to follow in, substantially as set forth.

In testimony whereof we have signed this specification in the presence of two subscribing witnesses.

MARSHALL TURLEY.
    REUBEN T. BRYANT.

Witnesses:
 A. S. HAZELTON,
 H. JAMES.